C. MACBETH.
MANUFACTURE OF TIRES.
APPLICATION FILED APR. 23, 1920.
1,362,169. Patented Dec. 14, 1920.
2 SHEETS—SHEET 1.
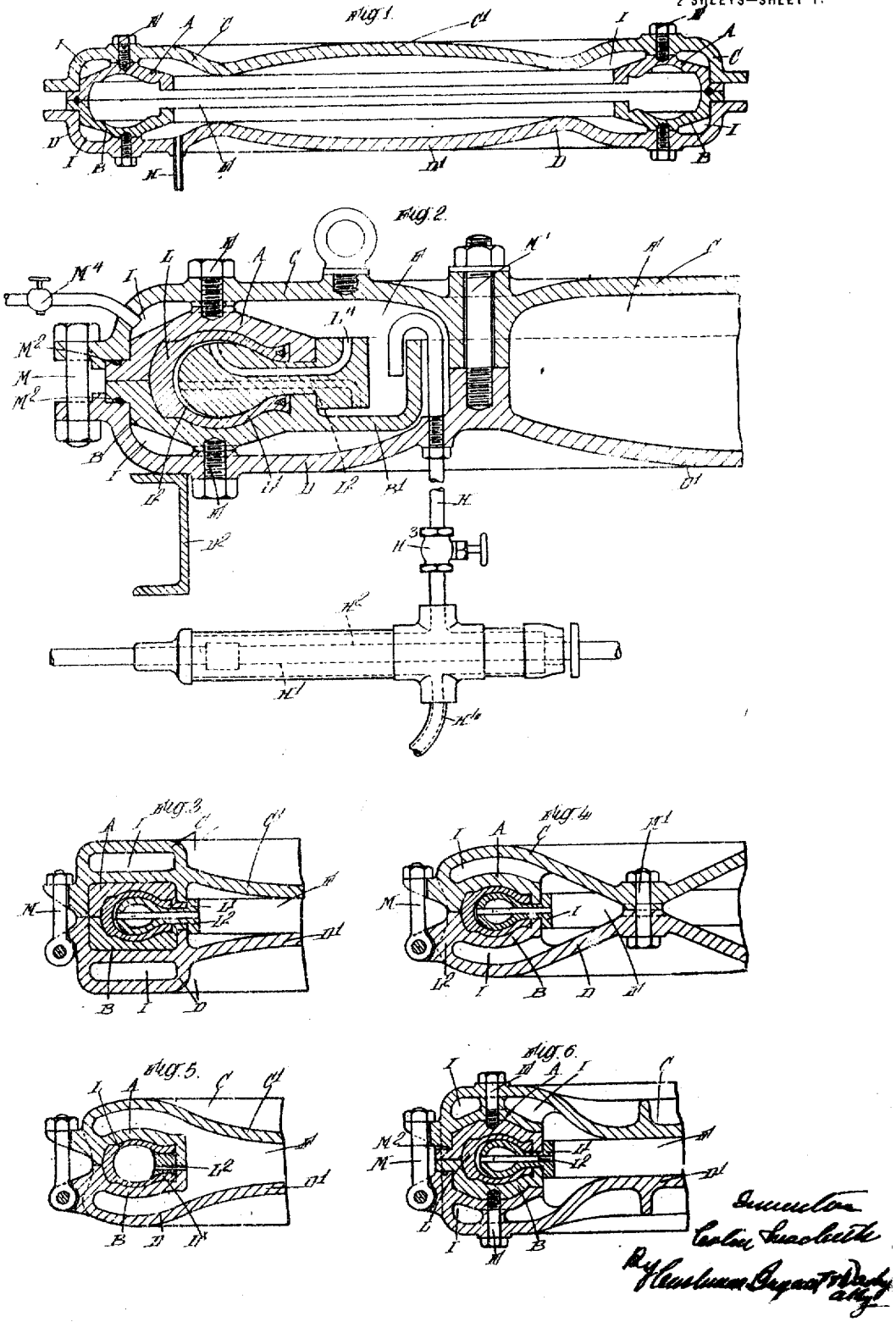

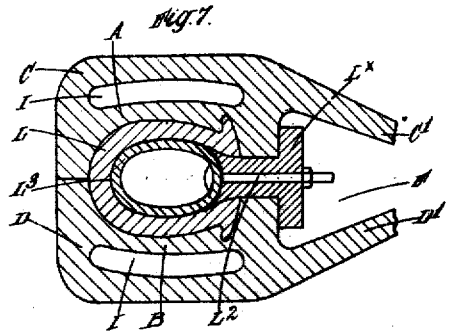
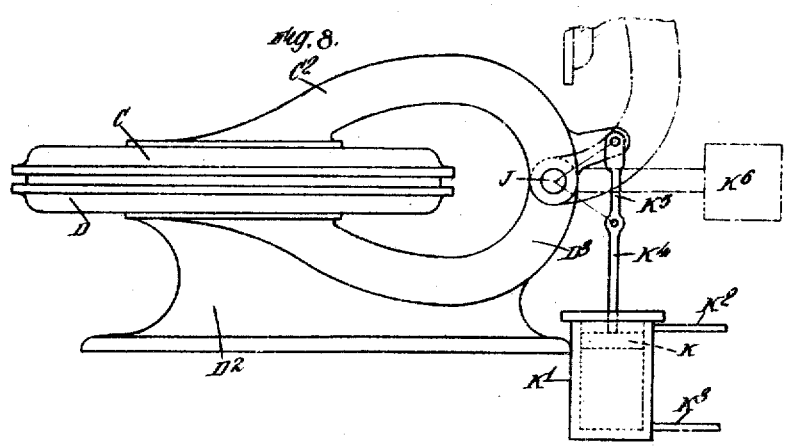
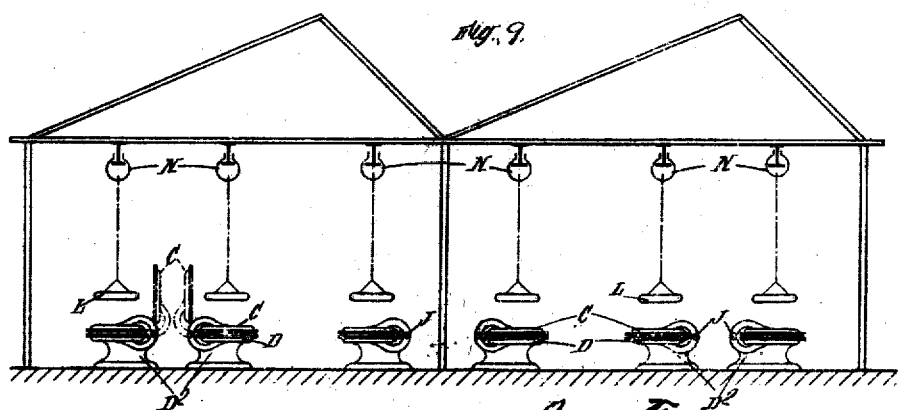

UNITED STATES PATENT OFFICE.

COLIN MACBETH, OF BIRMINGHAM, ENGLAND, ASSIGNOR TO THE DUNLOP RUBBER COMPANY, LIMITED, OF REGENTS PARK, LONDON, ENGLAND.

MANUFACTURE OF TIRES.

1,362,169.

Specification of Letters Patent.  Patented Dec. 14, 1920.

Application filed April 23, 1920. Serial No. 376,105.

*To all whom it may concern:*

Be it known that I, COLIN MACBETH, a subject of the King of Great Britain, residing at Fort Dunlop, Erdington, Birmingham, in the county of Warwick, England, have invented certain new and useful Improvements in or Relating to Manufacture of Tires, of which the following is a specification.

This invention relates to the manufacture of tires, and has more particular reference to the molding and vulcanizing of pneumatic tire covers or casings.

Canvas and fabric casings are often made by the method or process known as the internal pressure system in which fluid pressure is admitted to the interior of the casing while held in arched form in a mold so that the pressure within the casing stretches the casing at its outer or tread part into contact with the molding surfaces. In some internal pressure systems the casing is stretched outwardly by supplying fluid pressure to an inflatable bag or tube within the casing so that the internal pressure caused by the expansion or inflation of the said tube stretches the tire casing as required.

According to this invention the mold shells are associated with suitable portions which close the circular space within the inner circumferential edges of the mold shells so that an internal space is provided between the said portions to which internal space fluid pressure can be supplied and from which the pressure can be supplied to the interior of the casing or to jackets or spaces in the mold shells in close proximity to the molding space formed between the mold shells. The mold shells may be mounted in or may form part of dished or disk-like containers so that the internal space is provided between the dished or disk parts of the containers so as to avoid the necessity of making steam tight joints at the inner parts of the mold shells. One of the chief features of the invention consists in so arranging the interior parts of the containers that it is not necessary to break or disconnect the fluid pressure connections after each cure. The mold shells may be adapted to be used in conjunction with a rigid core or annular ring by means of which the inner or beaded edges of the casing on the core can be clamped or secured between the two mold shells while the tread or outer part of the casing does not make contact with the molding surface, until the fluid pressure is supplied to the interior casing. For convenience of description the term "containers" will be used to cover the case of the mold shells formed in one therewith and the case of the mold shells detachably secured thereto. One container is preferably supported in a horizontal position and forms the lower container while the upper container may be hinged to enable it to be closed down on the lower container and the means for supplying the fluid pressure are connected to the lower container.

In order that the said invention may be clearly understood and readily carried into effect, the same will now be described more fully with reference to the accompanying drawings, in which:—

Figure 1 is a diagrammatic sectional view showing upper and lower mold shells secured to disk-like containers.

Fig. 2 is a fragmentary sectional view showing, on an enlarged scale, a core and tire casing fitted in the mold shells and the pipe connections for supplying the fluid pressure.

Figs. 3, 4, 5, 6, and 7 are somewhat similar views to Fig. 2 (drawn to a smaller scale) showing modifications.

Fig. 8 is an elevation of one construction of the complete mold showing a fixed lower container and a hinged upper container.

Fig. 9 is a diagrammatic view illustrating one arrangement of the complete molds such as shown in Fig. 8.

A and B represent the upper and lower mold shells respectively. C and D represent respectively the upper and lower containers for the mold shells which may be secured in or to the containers by screws or bolts such as E as indicated for example in Figs. 1 and 2. The mold shells may however be secured in the containers in any appropriate manner or they may be formed in one therewith as shown in Figs. 4 and 5. In most of the examples shown the containers C, D are of disk form so that an interior space F is provided by the two diaphragms or central parts C' D' of the containers within the inner circumferential edges of the mold shells as diagrammatically shown in Fig. 1. The space F may constitute a chamber for steam or other fluid supplied through a connection H secured to the lower container which is usually a fixture and this space may be in communication with jackets or spaces I around the mold shells; the interior space F also avoids the necessity of making fluid tight joints at the inner circumference of the mold shells. The lower container may be fixed on any suitable form of support as shown at D² in Fig. 2, or it may be mounted on the base or support D² shown in Figs. 8 and 9. In the example shown in Fig. 8 the upper container C carrying the upper mold shell A is preferably hingedly mounted on a pin J by means of an arm C² extending from the container C, the pin J being mounted in an extension D³ of the support D².

Hydraulic means such as a piston K in a cylinder K' may be provided so that the admission of water to the upper or lower side of the piston through pipes K² K³ will move the piston which through a rod K⁴ and link K⁵ will effect the raising of the upper container to the open position or the lowering of the container to the closed position; a balance weight K⁶ may also be secured to the arm of the upper container to assist in the opening movement of the latter. When the upper container with its mold shell is in the raised or opened position a tire casing L on a core L' can be placed in the lower mold shell B and the upper container C is then lowered to bring its mold shell A into the closed position on the lower mold shell to embrace the casing L and the core L' as shown in Fig. 2. The upper and lower containers are then secured in the closed position by means of bolts M or other means at the outer circumference of the containers and if desired by bolts M' or other means, extending through suitable bosses on the container disposed within the inner circumference of the mold shells, see Fig. 2. Packing rings M² are provided between the mold shells and the containers to make fluid tight joints and effect a proper closure for the heating spaces I. The core L' may be collapsible or otherwise as may be required to suit wired or soft beaded casings. The core may also be solid or hollow. The tire casing is built up to such a size that its outer or tread part it does not completely fill the molding space formed between the two mold shells, so that by means of internal pressure within the casing, the latter can be stretched or expanded to contact with the mold shells, the casing being shown in its expanded position in Figs. 2 to 7. For the purpose of supplying fluid pressure to the interior of the casing the core L' is provided with a passage or pipe L² in communication with the space F between the containers and leading to the outer surface of the core so that fluid pressure can reach the interior surface of the outer part and if desired the sides of the casing and thus expand or stretch the casing into contact with the inner surfaces of the mold shells without displacing the casing at its beads or wired edges which are clamped between the core and the mold shells as shown. Owing to the pipe or passage L² leading to the outer surface of the core it prevents air inside a hollow core (see Figs. 3, 4 and 6) from coming into contact with the inner surface of the casing, thus preventing damage which is caused by air pressure on the uncured rubberized surface of the casing. One construction of means for admitting fluid pressure to the interior of the containers is shown in Fig. 2 wherein the pipe H extending through the lower container is bent over at its upper end to discharge the fluid into a space between the inner core and an upstanding flange B' preferably formed in one with the lower mold shell in order to insure that the fluid reaches the interior of the core and effects the expansion or stretching of the casing.

In order to prevent steam contacting with the interior surface of the tire casing hot water may be injected from a reserve container H' having a heating device such as a steam pipe H² and when the valve H³ is opened the water is forced from the container H' by pressure entering through the pipe H⁴. When this arrangement is employed the hot water is injected until it overflows the upstanding flange B' whereupon hot water is shut off and steam admitted to commence the cure. This system may be used to insure driving air out from between the core and casing and for this purpose the air may escape through the vent tube or passage L³ when the hot water is admitted.

It is very desirable to make a proper closure between the beads or edges of the casing and the mold shells, and such proper closure may be obtained by the screwing down of the securing bolts M' or other means and also by the action of the internal pressure. The casing itself forms the required fluid tight joint to prevent the internal pressure from escaping or diminishing. If desired drain pipes and valves M⁴ may be provided at suitable parts of the containers to prevent accumulation of condensation in the containers. Owing to the provision of the steam or heating spaces around the mold shells and the access of the steam or other heating medium thereto from the space F between the containers, the curing temperature can be quickly imparted to the molds.

Instead of using a complete core such as L' a ring L⁴ see Fig. 5 may be provided which serves to clamp and retain just the edges of the casing against the mold shells, this ring having a steam or fluid pressure pipe L² leading to the interior of the casing.

The example shown in Fig. 7 illustrates a bag or tube L³ within the casing; the bag or tube may be provided with a valve or pipe L² passing through a core ring L˟ for enabling fluid pressure to be admitted to the interior of the tube for expanding or forcing the outer part of the casing into contact with the mold shells. In order to prevent ingress of air between the tube L³ and the casing the pipe L² secured to the tube is adapted to be pulled against the core ring L˟, for example, by screwing up a nut threaded on the pipe against the inner surface of the core ring. Preferably the use of the air bag is avoided and the fluid is permitted to come into direct contact with the inner surface of the casing. In order to prevent the pressure medium from penetrating the casing, the inner surface may be coated with a thick layer of rubber solution, for example it may be brushed with a cold cure solution; or the inner ply or plies of the casing may be made of semicured rubberized fabric. The above description sets forth the general features of construction of the apparatus. Figs. 3, 4, 5 and 6 illustrate modifications in which the parts corresponding to those shown in Fig. 2 are designated by similar reference letters. In Fig. 3 the mold shells A and B are fitted in grooves formed in the containers and steam or heating spaces I are provided around the said grooves for heating the mold shells, which spaces may be supplied with the heating medium from the space F between the containers or from an independent source, preferably from an independent source so as to economize in the consumption of steam due to the heating spaces or jackets always being connected to the steam supply and not exhausted after each cure. In this example and also that shown in Fig. 4 the central or disk portions C' and D' of the containers are inwardly dished, to reduce the size of the steam space F between them. The modifications shown in Figs. 5 and 6 show the mold shells A and B formed in one with the containers C D in such manner as to provide the heating spaces around or in proximity to the portions forming the upper and lower mold shells.

The construction of the containers with removable mold shells is advantageous as the latter may be readily removed and substituted by others to take a different size or type of tire thereby enabling the same molding apparatus to be used for various types of tires. The steam or water connections are not disconnected from the apparatus during removal of the casings from the mold shells after curing as they are connected to the lower container which is not moved when the upper one is raised, thus eliminating trouble usually experienced in this respect. Internal pressure can be applied with a collapsible core in place so that it is not necessary to remove the uncured casing therefrom which is liable to be damaged by such removal. As stated above the use of an internal inflatable air tube or bag can be avoided as the mold shells and the casing constitute the internal pressure receiver. The constructions of the molding apparatus shown in the drawings present many advantages and also permit of the handling of tire cores, etc., being facilitated and expedited with a minimum of labor and little effort on the part of the operators. The molds may be placed under an overhead rail or runway along which may travel a carrier from which a core with casing thereon can be suspended either when placing in or when removing from the mold. The molds may be arranged in gangs or batches so that while one or (others) are being emptied another (or others) can be filled during which operations the other molds are closed and the cure of casings taking place. An overhead runway would serve for the several molds so arranged. A considerable number of molds may be arranged in a row served by a common overhead rail or runway and several of such rows with an overhead runway N for each row may be employed as shown in Fig. 9 and when the molds are arranged in this manner they may be staggered or otherwise positioned so that the opening of one mold will not interfere with the adjacent mold. As shown in Fig. 9 the molds in each pair of rows may be arranged back to back so that the upper containers move toward each other when opening, the space between each pair of rows serving as a gangway or passage for the operators.

What I claim and desire to secure by Letters Patent of the United States is:—

1. Apparatus for molding and vulcanizing tires comprising annular mold shells adapted to receive a tire, and members closing the circular space within the inner circumferential edges of said shells to provide an internal chamber between said members and shells to receive fluid pressure and from which the fluid pressure may be supplied to the interior of a tire arranged within the mold shells.

2. Apparatus for molding and vulcanizing tires comprising annular mold shells adapted to receive a tire, members closing the circular space within the inner circumferential edges of said shells to provide an internal chamber and jackets or spaces surrounding the shells, and means for supplying fluid under pressure to said central chamber and said jackets.

3. Apparatus for molding and vulcanizing tires and the like comprising mold shells adapted to receive a tire, disk-like members associated with said shells and forming a central chamber within the inner circumferential edges of the shells to which fluid pressure may be supplied, and means for establishing communication between said chamber and the interior of a tire held between said shells.

4. Apparatus for molding and vulcanizing tires comprising annular mold shells, disk-like members forming a fluid pressure chamber within the space surrounded by the inner edges of the mold shells, and means for supplying fluid pressure to said chamber.

5. Apparatus for molding and vulcanizing tires comprising annular mold shells, containers connected to said shells and forming a central fluid pressure chamber within the space surrounded by the inner edges of the shells and independent heating chambers about said mold shells, means for supplying fluid pressure to said central chamber, and means for supplying fluid pressure to said central chamber and the heating space about the mold shells.

6. Apparatus for molding and vulcanizing tires comprising upper and lower annular mold shells, and upper and lower horizontally arranged disk-like containers connected respectively to said upper and lower mold shells and forming a fluid pressure chamber within the space surrounded by the inner edges of the mold shells, the lower container being fixed while the upper one is movably mounted thereon.

7. Apparatus for molding and vulcanizing tires comprising upper and lower annular mold shells, upper and lower horizontally arranged disk-like containers connected respectively to said upper and lower shells and forming a fluid pressure chamber within the space surrounded by the inner edges of the said shells, and means for supplying fluid pressure to said chamber.

8. Apparatus for molding and vulcanizing tires comprising mold shells, adapted to receive a tire between them, means inclosing the space within the inner circumferential edges of the mold shells to form a fluid pressure chamber, and a core within the mold shells having means for conducting fluid pressure from said chamber to the interior of a tire within the mold shells.

9. Apparatus for molding and vulcanizing tires comprising annular mold shells, means closing the space surrounded by said shells to form a fluid pressure chamber, and a core within the shells having a flange bearing against the inner circumferential edges of the shells and provided with a duct whereby fluid pressure may be conducted from said central chamber to the outer surface of the core within the mold shells.

10. Apparatus for molding and vulcanizing tires comprising annular mold shells, means closing the space surrounded by said shells to form a fluid pressure chamber that communicates with the interior of the mold shells, means for supplying steam to said chamber, and means for preventing the steam supply to said chamber from contacting with the inner surface or plies of a tire arranged within the mold shells.

COLIN MACBETH.